US008134746B2

United States Patent
Shirai

(10) Patent No.: US 8,134,746 B2
(45) Date of Patent: Mar. 13, 2012

(54) PRINTING DEVICE, PRINTING METHOD, AND PRINT PROGRAM FOR COLORING A WHITE AREA OF A PRINT IMAGE

(75) Inventor: Satoshi Shirai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 523 days.

(21) Appl. No.: 12/286,237

(22) Filed: Sep. 29, 2008

(65) Prior Publication Data

US 2009/0086233 A1 Apr. 2, 2009

(30) Foreign Application Priority Data

Sep. 28, 2007 (JP) ................................. 2007-255004

(51) Int. Cl.
*H04N 1/60* (2006.01)
*H04N 1/00* (2006.01)
(52) U.S. Cl. .......................................... 358/1.9; 358/1.6
(58) Field of Classification Search .................... None
See application file for complete search history.

(56) References Cited

U.S. PATENT DOCUMENTS

| 5,937,232 | A | * | 8/1999 | Taguchi et al. | 399/81 |
| 6,016,205 | A | * | 1/2000 | Silverberg et al. | 358/1.6 |
| 6,882,447 | B1 | * | 4/2005 | Nakajima et al. | 358/1.9 |
| 7,760,395 | B2 | * | 7/2010 | Torikoshi | 358/1.9 |
| 2006/0250427 | A1 | * | 11/2006 | Kroon et al. | 347/9 |

FOREIGN PATENT DOCUMENTS

| JP | 11-138790 | 5/1999 |
| JP | 2001-111814 | 4/2001 |
| JP | 2003-143422 | 5/2003 |

\* cited by examiner

*Primary Examiner* — Twyler Haskins
*Assistant Examiner* — Christopher D Wait
(74) *Attorney, Agent, or Firm* — Nutter McClennen & Fish LLP; John J. Penny, Jr.; Christina M. Sperry

(57) ABSTRACT

There is provided a printing device that generates print data used for a printing process based on a print source. The printing device includes a duplication unit that duplicates a spool file that is generated from a single print source in a case where a direction for coloring a margin area in a predetermined color is received, a rendering unit that generates a print image by drawing one of the spool files, a halftone unit that generates first position data indicating a white area of an object included in the print image to be also an area in which the object exists by drawing the spool file by using a technique different from that used by the rendering unit and performs a halftone process for the area, in which the object is determined to exist based on the first position data, of the entire area of the print image, and a print data generating unit that generates the print data based on halftone data generated by the halftone unit.

9 Claims, 14 Drawing Sheets

FIG. 4

PRINT CONDITION SETTING SCREEN

PRINTER TO BE USED

▽ PX-6500

APPLYING FILLING EFFECT IN BACKGROUND

☑ OFF

☐ ON

☐ ON (ENTIRE SURFACE)

( DETERMINATION ) ( CANCEL )

FIG. 6

LUT12b

| R | G | B | ←→ | C | M | Y | K |
|---|---|---|----|---|---|---|---|
| 0 | 0 | 0 | ←→ | 0 | 0 | 0 | 255 |
| 15 | 0 | 0 | ←→ | : | : | : | : |
| 31 | : | : | ←→ | : | : | : | : |
| ⋮ | ⋮ | ⋮ | : | : | : | : | : |
| 255 | 255 | 255 | ←→ | 1 | 1 | 0 | 0 |

FIG. 11
FIRST POSITION DATA (POI) @X1
SECOND POSITION DATA (SOI) @X1
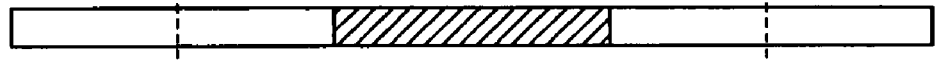
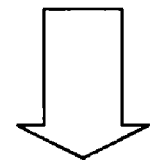
AREA IN WHICH OBJECT EXISTS @X1

023
PRINTING DEVICE, PRINTING METHOD, AND PRINT PROGRAM FOR COLORING A WHITE AREA OF A PRINT IMAGE

The entire disclosure of Japanese Patent Application No. 2007-255004, filed Sep. 28, 2007 is expressly incorporated by reference herein.

BACKGROUND

1. Technical Field

The present invention relates to a printing device, a printing method, and a print program, and more particularly, to a printing device that generates print data used for performing a printing process based on a print source.

2. Related Art

When photo image data or the like is printed, a margin area is generated outside a photo image area to which the photo image data is assigned. When a color converting process and a halftone process are performed for the margin area as the photo image area, the margin area may be colored with ink so as to be colored in an ideal white color. This process is performed because there is a case where the color of a printing sheet and the color represented by a white color included in the photo image data are different from each other. In such a case, in order to eliminate the difference, there is a case where a white area is colored with ink. In such a case, color matching with high accuracy can be performed. However, when the margin area is colored with ink, there is a problem that a user feels that ink is unnecessary consumed.

Regarding the above-described problem, a technique for determining whether each pixel to be converted in colors is originated from draw data such as data of a margin area or image data such as data of a photo image area in a stage for a color converting process and performing different color converting processes corresponding to the results of determination for the pixels has been proposed (see JP-A-2001-111814). In JP-A-2001-111814, management pixel data used for determining whether each area after a rendering process is originated from the draw data or the image data is generated in advance when a rendering process is performed based on a drawing command. Then, in a color converting process performed after the rendering process, a color converting process appropriate for each pixel is performed by referring to the management pixel data. Accordingly, it is possible to perform a color converting process in which ink is not used for a white area originated from the draw data such as the data of the margin area.

However, there is a case where the renderer for performing the rendering process cannot be made to generate the management pixel data. Thus, there is a problem that the above-described technique cannot be applied in such a case. In particular, when the renderer is implemented by a function other than a printer driver of an operating system or the like, the printer driver cannot intervene in the rendering process, and there is a problem that the above-described management pixel data cannot be generated.

SUMMARY

An advantage of some aspects of the invention is that it provides a print control device, a print control method, and a print control program capable of determining the origin of a white color without using a special process performed by the renderer.

In a printing device according to an aspect of the invention, a duplication unit duplicates a spool file that is generated from a single print source in a case where a direction for coloring a margin area in a predetermined color is received. For example, the duplication unit may duplicate the spool file by generating the spool file and copying the spool file. A rendering unit generates a print image by drawing one of the duplicated spool files. The rendering unit can draw the input spool file, and thus, the rendering unit is not needed to substantially perform a special process. A halftone unit generates first position data indicating a white area of an object included in the print image to be also an area in which the object exists by drawing the spool file by using a technique different from that used by the rendering unit. In addition, the halftone unit performs a halftone process for the area, in which the object is determined to exist based on the first position data, of the entire area of the print image. In other words, the target for the halftone process is limited to the area in which an object exists, and the halftone process is not performed for other areas. Accordingly, for an area other than the area, in which an object exists, that is represented by the first position data, coloring by using the coloring material can be avoided. A print data generating unit generates the print data based on halftone data generated by the halftone unit.

As a concrete technique for generating the first position data, it may be configured that a drawing process is performed on a black canvas based on the spool file, and an inverted image acquired from performing black-white inversion in a transparent mode is drawn for the black canvas based on the spool file. In such a case, while the area in which an object exists can be represented in a color other than the white color in the first position data, an area in which an object does not exist can be represented in the white color. Accordingly, it is possible to easily determine whether an object exists or not.

In addition, the first position data is generated to independently perform a drawing process from the print image, and thus, there is a possibility that there is a difference between the print image and the first position data. In consideration of this problem, it may be configured that second position data is generated based on the print image generated by the rendering unit and the halftone process is performed for the area in which an object is determined to exist based on both the first position data and the second position data. Since the second position data is generated from the print image, the second position data has an accurate position of an object. Accordingly, inaccuracy of position determination on the basis of the first position data can be prevented by the second position data.

In addition, when the duplication unit does not duplicate the spool file and there is only one spool file, the halftone unit may perform the halftone process only for an area, which is not colored in white, of the print image. As described above, by newly changing the halftone process, a method of presenting a white color in a print image can be set in accordance with a request of a user.

In addition, it is apparent that the technical idea of the invention may be implemented as a printing method used in a printing device. In addition, the invention may be implemented by using a computer by allowing the computer to read a print program for implementing the printing method and to perform a predetermined function. In addition, the technical idea of the invention may be implemented in an apparatus, a method, or a program that partly include the above-described printing device, the printing method, and the print program. For example, the advantages of the invention can be acquired in a scanner-attached printer including the units of the above-described printing device. In addition, the units, processes, or functions included in the above-described printing device, the printing method, and the print program may be divided in a plurality of devices. For example, a plurality of functions may be implemented by a plurality of computers that are interconnected through a network.

BRIEF DESCRIPTION OF THE DRAWINGS

The invention will be described with reference to the accompanying drawings, wherein like numbers reference like elements.

FIG. 4 is a diagram showing a UI screen according to an embodiment of the invention.

FIG. 6 is a diagram showing a LUT according to an embodiment of the invention.

FIG. 8 is a schematic diagram showing a printing process according to an embodiment of the invention for a case where a filling effect in a white background is turned on.

FIG. 11 is a schematic diagram showing a process for determining an area in which an object exists according to an embodiment of the invention.

FIG. 12 is a diagram showing an example of a print result according to an embodiment of the invention for a case where the filling effect in a white background is turned on.

DESCRIPTION OF EXEMPLARY EMBODIMENTS

Figure 1:
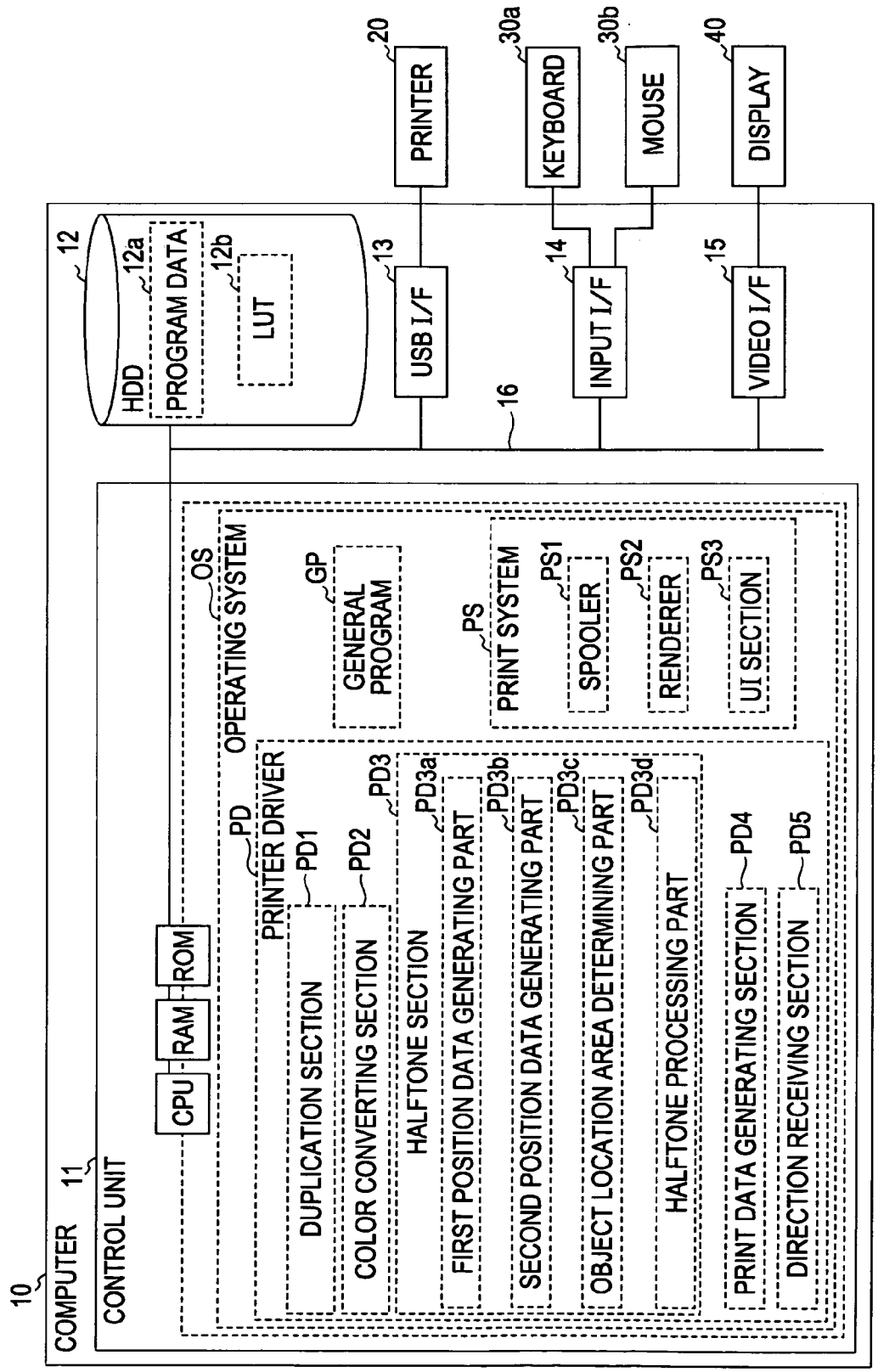
FIG. 1 is a block diagram of a computer according to an embodiment of the invention.

Hereinafter, an embodiment of the invention will be described in the following order.
(1) Configuration of Printing Device
(2) Printing Process
  (2-1) Process for Case Where Filling Effect In White Background Is Turned On (Entire Surface)
  (2-2) Process for Case Where Filling Effect In White Background Is Turned On
  (2-3) Process for Case Where Filling Effect In White Background Is Turned Off
(3) Modified Example
(1) Configuration of Printing Device FIG. 1 shows the configuration of a computer constituting a part of a printing device according to an embodiment of the invention. In the figure, the computer 10 is configured by a control unit 11 having a CPU, a RAM, a ROM, and the like, a hard disk drive (HDD) 12, a USB interface (I/F) 13, an input interface (I/F) 14, a video interface (I/F) 15, a bus 16, and the like. Through the bus 16, transmission or reception of data can be made among the control unit 11, the HDD 12, the USB I/F 13, the input I/F 14, and the video I/F 15. To the USB I/F 13, a printer 20 is connected. In addition, to the input I/F 14, a keyboard 30a and a mouse 30b are connected. To the video I/F 15, a display 40 is connected. In the HDD 12, an operating system OS, a printer driver PD, and program data 12a used for executing an application APL are stored. While reading the program data 12a and expanding the program data in the RAM, the CPU of the control unit 11 performs operations corresponding to the operating system OS, the printer driver PD, and a general program GP as an application.

In the control unit 11, the operating system OS is executed. In addition, the printer driver PD and the general program GP are executed under the operating system OS. The operating system OS has APIs that can be commonly used by the programs. As one of the APIs, a print system PS is provided. The print system PS is configured by a spooler PS1, a renderer PS2, a UI section PS3, and the like. The spooler PS1, for example, performs a spool function by converting a print source IS directed from a general program GP such as a word processor software program into a spool file SF including a drawing command. The render PS2 performs a function for generating bit map data (print image ID) corresponding to the print source IS by drawing (rendering) based on the drawing command of the spool file SF. The printer driver PD is configured by a duplication section (means) PD1, a color converting section PD2, a halftone section (means) PD3, a print data generating section (means) PD4, and a direction receiving section PD5.

The duplication section PD1 performs a function for copying the spool file SF to be duplicated when the spool file SF generated by the spooler PS1 is transferred to the renderer PS2. The color converting section PD2 performs color conversion for the print image ID generated by the renderer PS2 by referring to a lookup table (LUT) 12b stored in the HDD 12. The printer 20 according to this embodiment performs a printing process by using ink of cyan (C), magenta (M), yellow (Y), and black (K). Accordingly, the print image ID is converted in color as bit map data of ink amounts of CMYK. The halftone section PD3 is configured by a first position-data generating part PD3a, a second position-data generating part PD3b, an object location area determining part PD3c, a halftone processing part PD3d, and the like. The first position-data generating part PD3a performs a function for generating first position data POI by drawing based on the drawing command of the spool file SF by using a predetermined method. In addition, the second position-data generating part PD3b performs a function for generating second position data SOI based on the print image ID. The object location area determining part PD3c performs a process for determining an object location area by scanning each raster of the first position data POI and the second position data SOI. In addition, when a predetermined direction is received by the direction receiving section PD5, the object position area determining part PD3c performs a process for determining an area in which an object exists based on only the second position data SOI. The halftone processing part PD3d performs a halftone process for the area, in which an object exists, of the print image ID or the entire area of the print image ID. As a result, halftone data is generated. As a technique for performing the halftone process, a dithering method or an error diffusing method can be used. The print data generating part PD4 performs a function for converting the halftone data into print data that can be interpreted by the printer 20 by performing a micro-weave process or the like for the halftone data. For the processes performed by the above-described software configurations will be described in detail in a description of a printing process.

Figure 2:
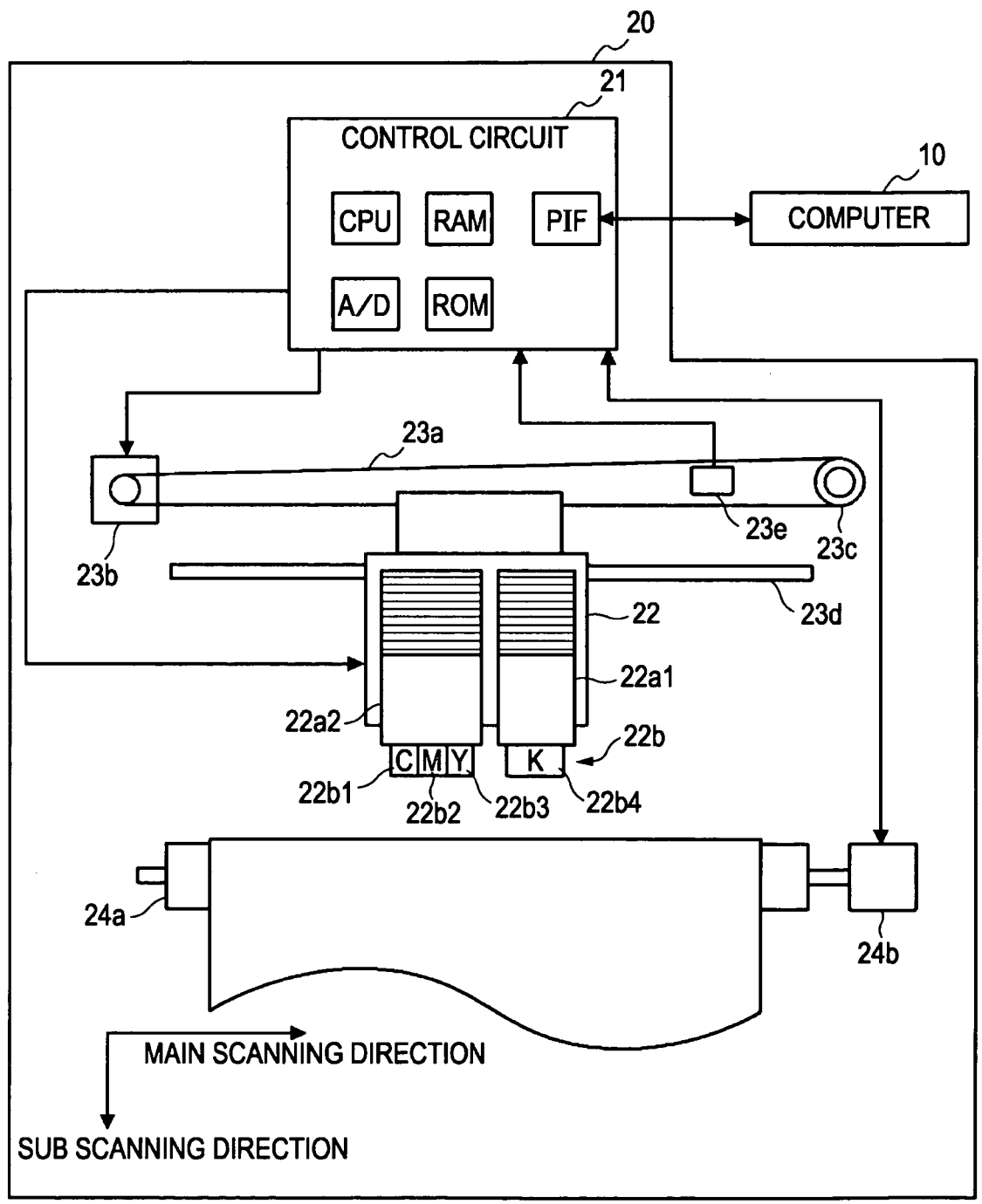
FIG. 2 is a block diagram of a printer according to an embodiment of the invention.

FIG. 2 is a schematic diagram showing the internal configuration of the printer 20. In the printer 20, a control circuit 21 that controls the overall operation of the printer, a print carriage 22 for printing an image on a printing sheet, a moving mechanism for moving the print carriage 22 in a main scanning direction, a transporting mechanism for transporting a printing sheet, and the like are mounted. The print carriage 22 is configured by an ink cartridge 22a1 that stores ink K, an ink cartridge 22a2 that stores various kinds of ink such as ink C, ink M, and ink Y, a print head 22b that is installed to the bottom face side, and the like. In the print head 22b, ink ejecting heads 22b1 to 22b4 that eject ink droplets are installed for each kind of ink. When the ink cartridges 22a1 and 22a2 are installed to the print carriage 22, ink inside the cartridges is supplied to the ink ejecting heads 22b1 to 22b4 of each color though introduction tubes not shown in the figure.

The moving mechanism for moving the print carriage 22 in the main scanning direction is configured by a carriage belt 23a for driving the print carriage 22, a carriage motor 23b for supplying power to the carriage belt 23a, a tension pulley 23c for applying appropriate tension to the carriage belt 23a constantly, a carriage guide 23d for guiding moving of the print carriage 22, an origin position sensor 23e for detecting the position of an origin point of the print carriage 22, and the like. When the carriage motor 23b is rotated under control of a control circuit 21 to be described later, the print carriage 22 can be moved in the main scanning direction by a distance corresponding to a rotation angle thereof. In addition, when the carriage motor 23b is rotated inversely, the print carriage 22 can be moved in the inverse direction. The transporting mechanism for transporting a printing sheet is configured by a platen 24a that holds the printing sheet on the rear side, a paper transporting motor 24b that transports the printing sheet by rotating the platen 24a, and the like. By rotating the paper transporting motor 24b under control of the control circuit 21 to be described later, a printing sheet can be transported in a sub scanning direction by a distance corresponding to a rotation angle of the paper transporting motor.

The control circuit 21 has a CPU as its principal element and is configured by a ROM, a RAM, a D/A converter that converts digital data into an analog signal, a peripheral device interface PIF that is used for data exchange between peripheral devices and the printer, and the like. While performing main and sub scanning operations of the print carriage 22 by driving the carriage motor 23b and the paper transporting motor 24b, the control circuit 21 controls ejection of ink droplets by supplying driving signals to the ink ejecting heads 22b1 to 22b4 of each color. The driving signals supplied to the ink ejecting heads 22b1 to 22b4 are generated based on the print data generated by the computer 10. While moving the print carriage 22 in the main scanning direction and the sub scanning direction (paper transporting direction, see FIG. 2) under control of the control circuit 21, ink dots of each color are formed on a printing sheet by ejecting ink droplets from the ink ejecting heads 22b1 to 22b4. Accordingly, a color image can be printed on the printing sheet.

(2) Printing Process

Figure 3:
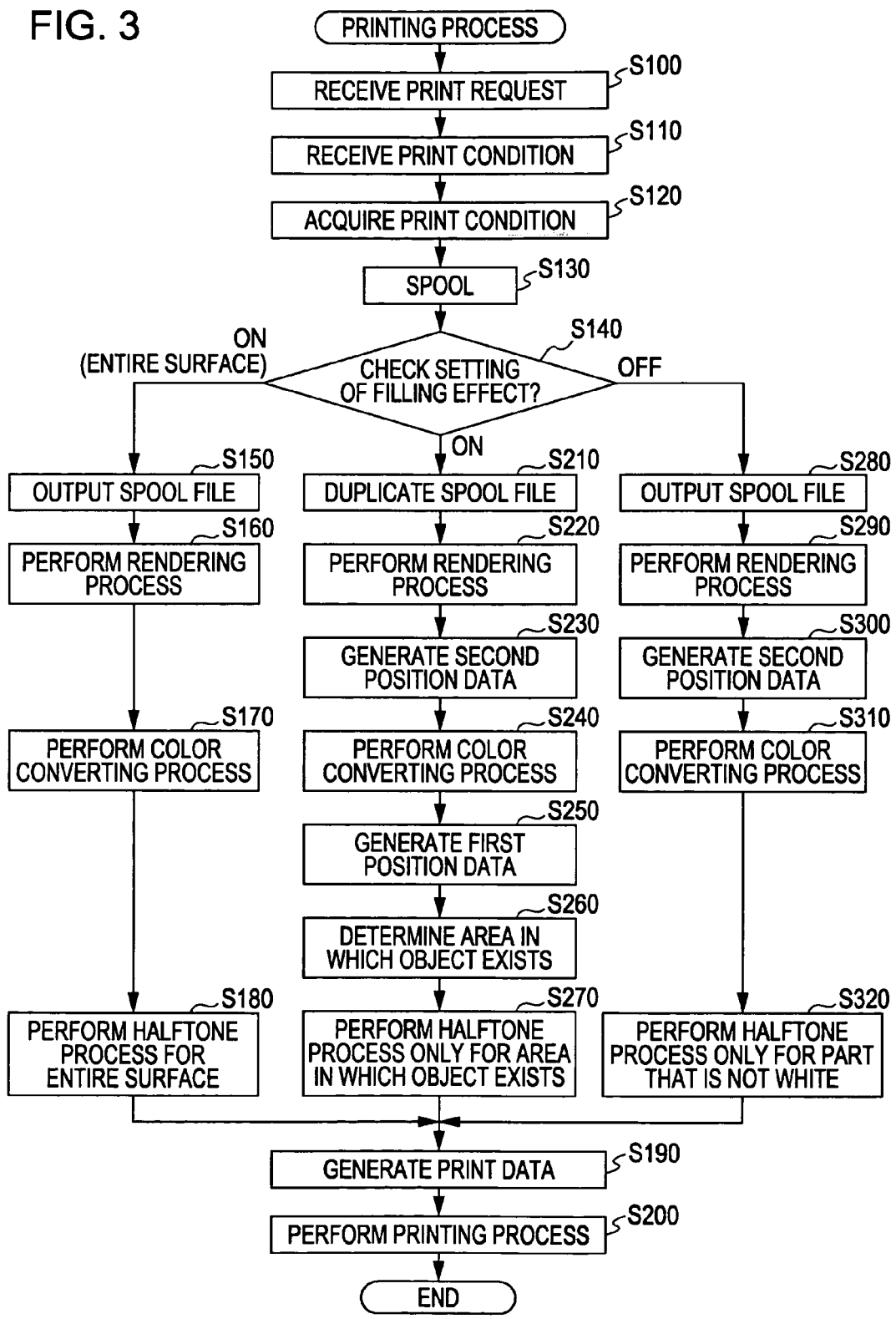
FIG. 3 is a flowchart of a printing process according to an embodiment of the invention.

FIG. 3 shows the flow of the printing process. In Step S100, the general program GP executed by the control unit 11 of the computer 10 receives a print request from a user. For example, in a word processor software program, a print request may be received in a case where a print button is pressed. In Step S110, at the same time when the UI section PS3 of the print system PS provided by the operating system OS displays a UI screen used for setting a print condition on a display 40, an operation of a user is received by using the keyboard 30a and the mouse 30b. Although the UI screen is basically provided by the UI section PS3 of the print system PS, unique items of the printer 20 are provided by the direction receiving section PD5 of the printer driver PD.

FIG. 4 shows a UI screen displayed in Step S110. In the figure, items used for designating a printer 20 used for a printing process and the like are arranged. In the lowest portion thereof, an item for receiving a setting for turning the filling effect in a white background on or off is provided. This item is provided by the direction receiving section PD5 of the printer driver PD. In particular, a direction for any one of "off", "on", and "on (entire face) can be made. When click on a print button is detected in Step S110, in Step S120, the setting at a time when the click is detected is acquired by the UI section PS3 of the print system PS and the direction receiving section PD5 of the printer driver PD. In Step S130, the spooler PS1 acquires a print source IS such as a document or photographic image data from the general program GP and generates the spool file SF based on the various settings acquired in Step S120. Next, in Step S140, a next process to be performed is branched based on the setting of "filling effect in a white background" acquired in Step S120, and one of halftone processes having three different modes is performed by the halftone processing part PD3d.

(2-1) Process for a Case Where Filling Effect in White Background is Turned On

Figure 5:
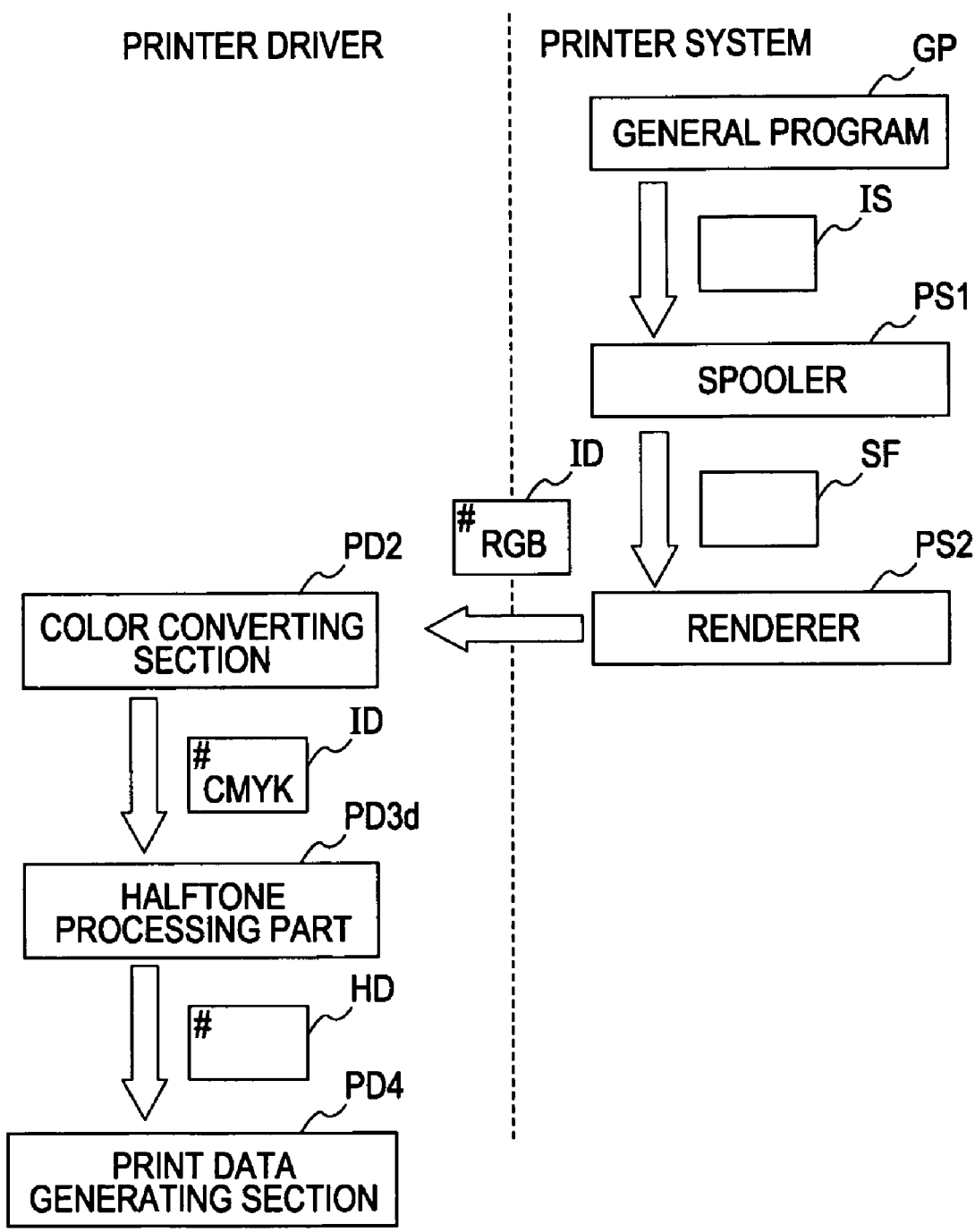
FIG. 5 is a schematic diagram showing a printing process according to an embodiment of the invention for a case where a filling effect in a white background is turned on (the entire surface).

FIG. 5 schematically shows the flow of data in a case where a direction for turning on (entire surface) the filling effect in a white background is received from a user. In Step S150, the spooler PS1 outputs the spool file SF to the renderer PS2 located on the next stage. Next in Step S160, the renderer PS2 performs a drawing process based on the drawing command included in the spool file SF and the setting information acquired in Step S120 so as to generate the print image ID in which the color of each pixel is represented in a predetermined color space. In this embodiment, it is assumed that the print image in which the color of each pixel is represented in the RGB color space of 256 gray scale levels. In other words, in the drawing process performed by the renderer PS2, first, a canvas of a white color R=G=B=255 is prepared, and objects are disposed on the canvas based on the drawing command. In Step S170, the print image ID is transferred to the color converting section PD2 of the printer driver PD. Then, the color converting section PD2 performs a color converting process for the print image ID by referring to the LUT 12b. Accordingly, the print image ID in which the color of each pixel is represented by the amounts of ink of CMYK to be ejected from the ink ejecting heads 22b1 to 22b4 of the printer 20 can be acquired.

FIG. 6 shows the LUT 12b that is referred to by the color converting section PD2 in this embodiment. In the LUT 12b shown in the figure, a correspondence relationship between RGB values and CMYK values for each grid that covers the entire color space is defined. Here, the CMYK values that are associated with R=G=B=255 representing a white color of the RGB color space are not C=M=Y=K=0 but small values of CM (C=M=1 and Y=K=0). The values of CMYK represent the amounts of ink of CMYK ejected from the ink ejecting heads 22b1 to 22b4 in a printing process. Thus, for a pixel of C=M=Y=K=0, any kind of ink is not ejected. In other words, for a pixel of C=M=Y=K=0, a white color that is the color of a printing sheet is represented as the result of the printing process. On the other hand, for a pixel of R=G=B=255 that represents a white color of the RGB color space, CMYK values having small values of CM (C=M=1, Y=K=0) can be associated. Thus, a pixel representing a white color of the RGB color space is represented by using small amounts of ink of CM. In other words, the white color of the RGB color space is configured to be represented not by the color of the printing sheet but by using small amounts of ink of CM. When a printing process is performed for a printing sheet of which background color is slightly yellow, a color closer to a real white color than the background color can be represented by mixing small amounts of ink of CM in the background color. The LUT 12b according to this embodiment is prepared for a case where a printing process is performed for a printing sheet of which background color is slightly yellow. Accordingly, the white color of the RGB color space can be represented to be closer to the white color than the background color of the printing sheet. Therefore, a printing process having superior accuracy can be performed.

In Step S180, the print image ID is acquired by the halftone processing part PD3d of the halftone section PD3, and the halftone section PD3 performs a halftone process for the entire print image ID. Accordingly, halftone data HD that defines whether ink is ejected from the ink ejecting heads 22b1 to 22b4 of the printer 20 for each pixel can be acquired. In Step S190, the halftone data HD is transferred to the print data generating section PD4, and the print data generating section PD4 generates print data PD by performing a microweave process or the like for the halftone data HD. In Step S200, the print data PD is output to the printer 20, and the printer 20 performs a printing process based on the print data PD.

Figure 7:
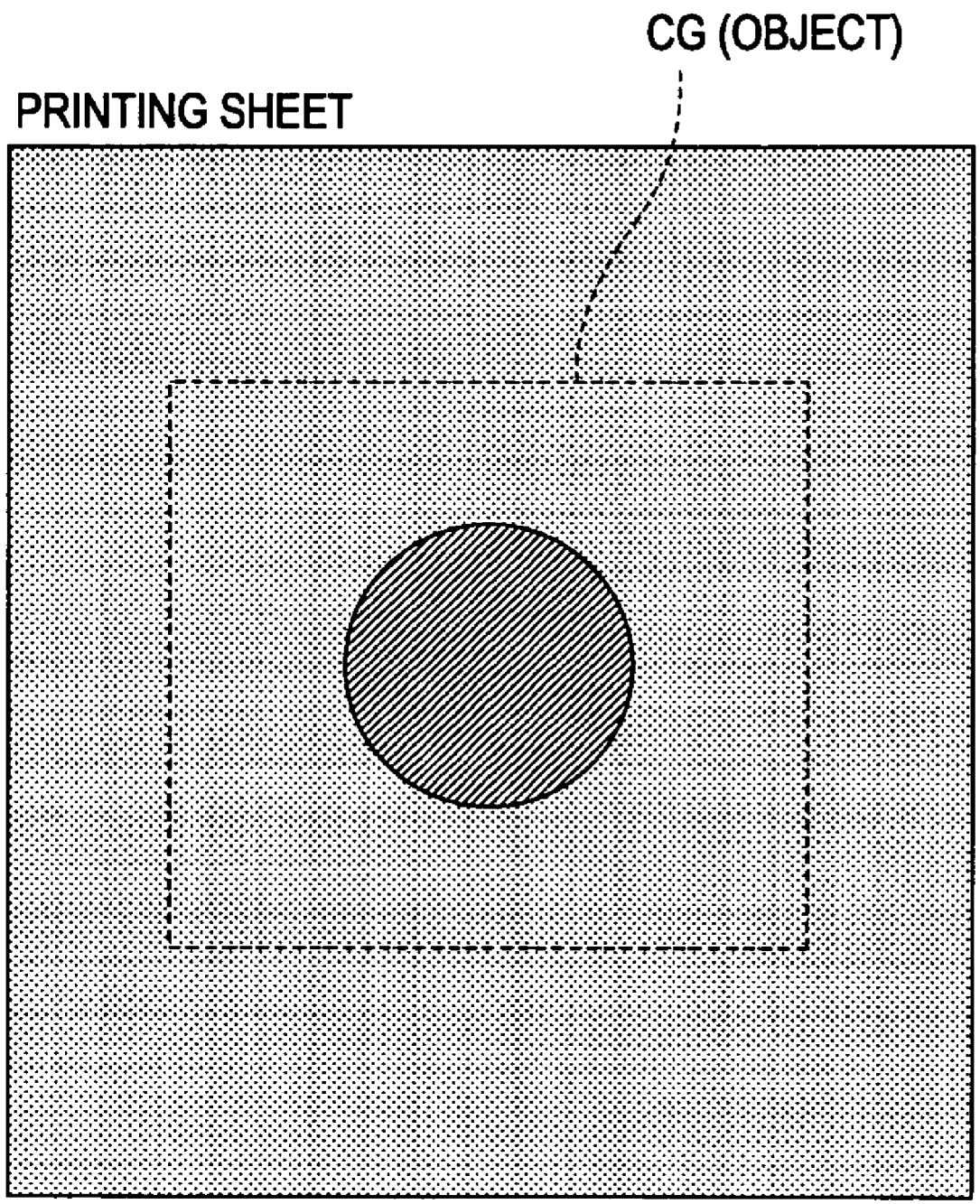
FIG. 7 is a diagram showing an example of a print result according to an embodiment of the invention for a case where the filling effect in a white background is turned on (the entire surface).

FIG. 7 shows an example of the print result for a case where the filling effect in a white background is turned on (the entire surface). The figure shows the print result of a print source IS in which a CG (Computer Graphics) as an object is disposed in the center thereof. In the CG, it is assumed that a circle painted all in red is drawn in the center of a white colored (R=G=B=255 in the RGB color space) background. An outside area of the CG becomes a margin area in which any object does not exist. In Step S160, in the stage in which the renderer PS2 generates the print image ID of the RGB color space, all the pixels belonging to the background of the CG and the margin area located outside of the CG are represented by R=G=B=255 representing a white color of the RGB color space. In Step S170, the color converting section PD2 performs the color converting process uniformly for the print image ID by referring to the LUT 12b. Thus, the background inside the CG and the margin area located outside of the CG are converted in colors as pixels having values of CMYK of C=M=1 and Y=K=0. In the following Step S180, in order for the halftone processing part PD3d to perform the halftone process uniformly for the entire print image ID, a pixel to which ink of CM is ejected is generated in the white background inside the CG and the margin area outside the CG at the probability of non-zero. Accordingly, as denoted by black dots shown in FIG. 7, dots of ink of CM are scattered in the background inside the CG and the margin area outside the CG. In other words, in an area to be represented in the white color, small amounts of ink are ejected. Such a filling effect is generated for the entire area regardless of inside or outside (the background inside the CG and the margin area outside the CG) of the CG, and accordingly, accurate color matching of the white color can be performed for an area including the margin area. In addition, a same halftone process is performed for the background inside the CG and the margin area outside the CG. Thus, the boundary denoted by a dotted line cannot be visually recognized, and the white background inside the CG and the margin area outside the CG are not distinguishable from each other.

(2-2) Process for Case Where Filling Effect in White Background is Turned On

Figure 8:
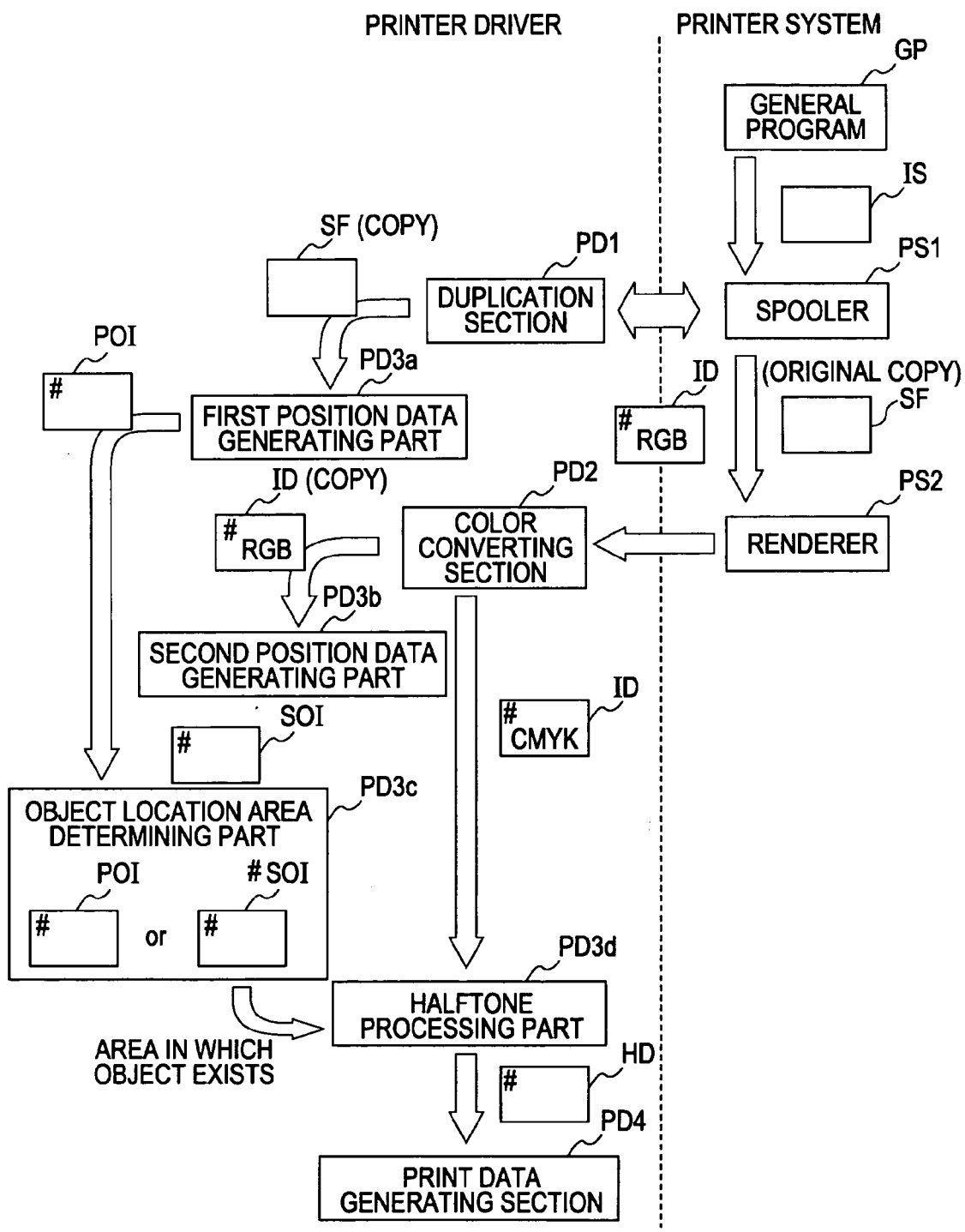

FIG. 8 schematically shows the flow of data in a case where a direction for turning on the filling effect in a white background is received from a user. In Step S210, the spooler PS1 outputs a spool file SF to the renderer PS2 located on the next stage. At this moment, the duplication section PD1 of the printer driver PD acquires the spool file SF and copies the spool file SF. In addition, the original spool file SF is directly output to the renderer PS2. To the copied spool file SF, a flag indicating that the spool file is a copy is attached, and the copied spool file SF is stored in the RAM. For the spool file SF output to the renderer PS2, in Step S220, a rendering process that is the same as that in Step S160 is performed so as to generate a print image ID of the RGB color space. In Step S230, the second position data generating part PD3b acquires the print image ID of the RGB color space after the rendering process and performs a process for generating the second position data SOI based on the print image ID.

Figure 9:
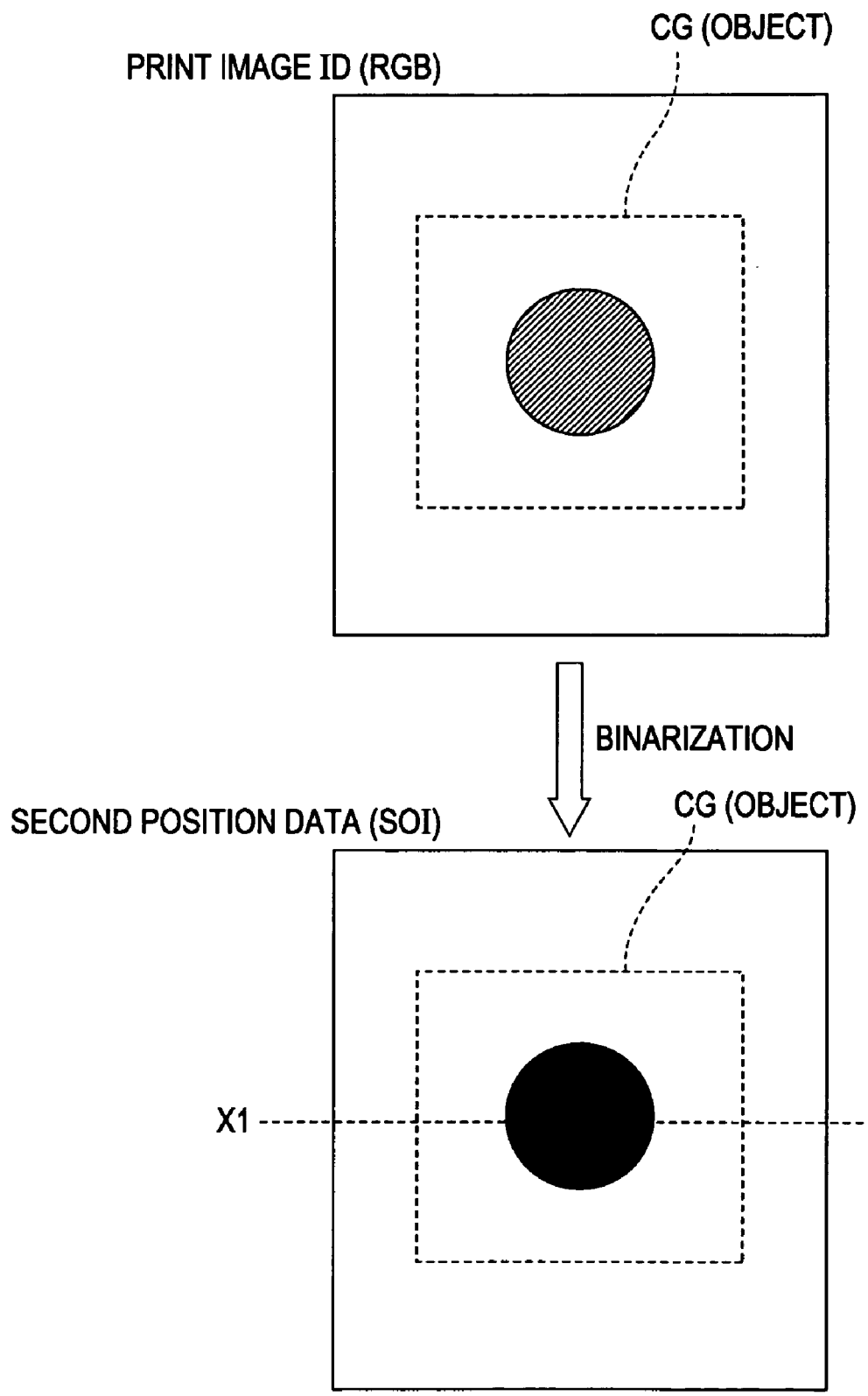
FIG. 9 is a schematic diagram showing the sequence of a process for generating second position data SOI according to an embodiment of the invention.

FIG. 9 schematically shows the sequence of the process for generating the second position data SOI for the print source IS as shown in FIG. 7. First, a copy of the print image ID is generated, and the copied print image ID is converted into bit map data of 256 gray scale levels. Since each pixel of the print image ID is represented by values of RGB, the values of RGB are converted into luminance Y (Y=0.3×R+0.59×G+0.11×B). Then, the second position data SOI of a binary gray scale is generated by binarizing the pixels based on whether the converted luminance Y thereof is 255 (a white color). Here, an area, in which an object does not exist, of the print image ID is in a state of a white canvas (R=G=B=255), and thus, the luminance Y becomes 255 that represents the white color. Accordingly, basically, the second position data SOI of the binary gray scale is generated, so that an area in which an object exists (represented in black in the figure) and an area in which an object does not exist (represented in white in the figure) can be identified based on the binary gray scale values. However, since a white color included in the object is binarized as a white pixel in the same manner as that in the area in which an object does not exist, the above-described areas cannot be completely identified. For example, although a white background part inside the CG is located inside the CG as an object, the white background part is binarized as a white color, and thus, the white background part and the area outside the CG cannot be identified from each other. In Step S240, the print image ID as the copy source is transferred to the color converting section PS2 of the printer driver PD, and a color converting process is performed as in Step S170.

On the other hand, the spool file SF that has been copied in Step S210 is output to the halftone section PD3 in Step S250. The halftone section PD3 interprets the flag of the spool file SF and recognizes that the spool file SF is a duplicated spool file. The copied spool file SF is transferred to the first position data generating part PD3a, and a first position data generating process for generating the first position data POI based on the spool file SF is performed in Step S250.

Figure 10:
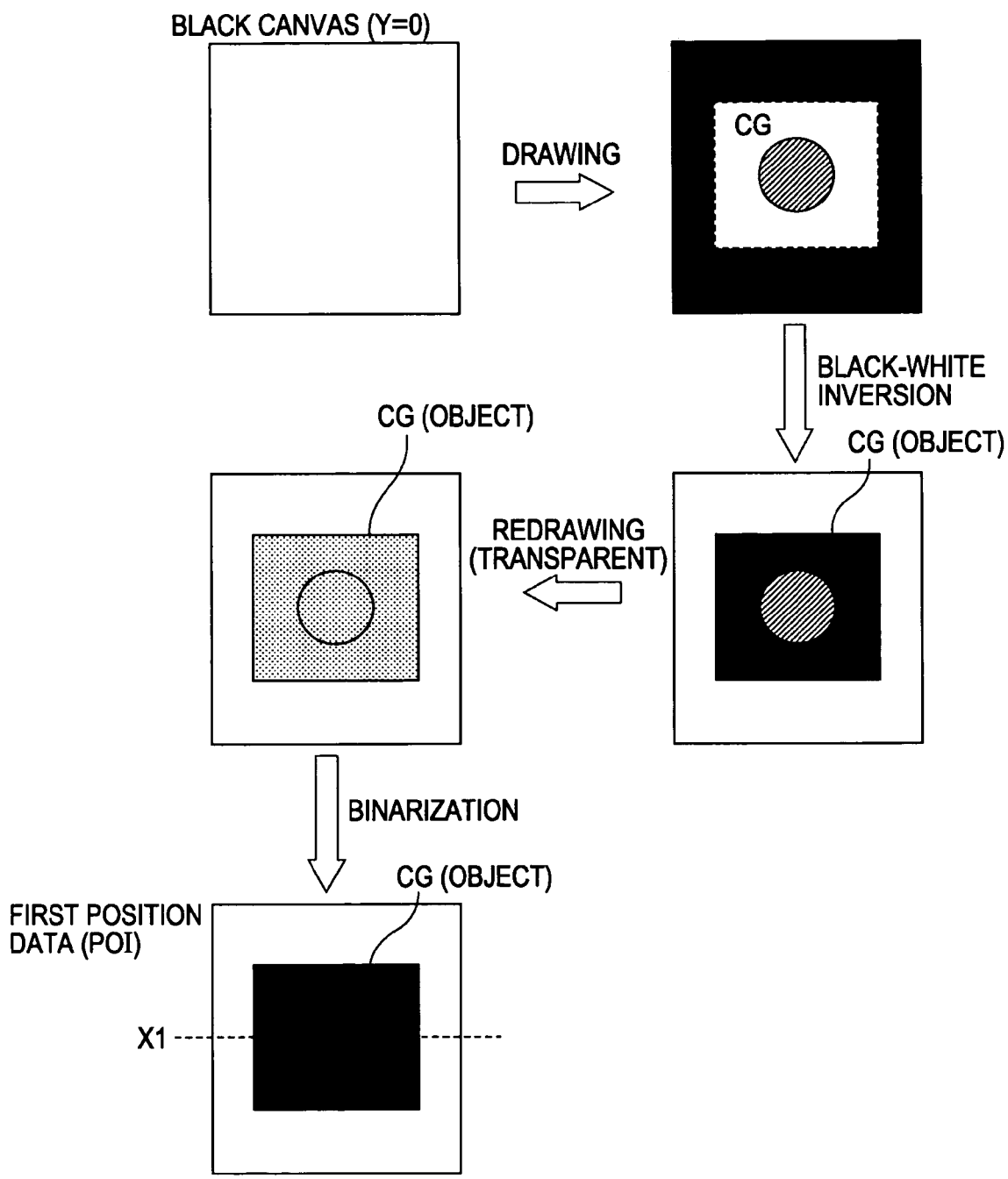
FIG. 10 is a schematic diagram showing the sequence of a process for generating first position data POI according to an embodiment of the invention.

FIG. 10 schematically shows the sequence of a process for generating the first position data POI for the print source IS as shown in FIG. 7. In the first position data generating process, the canvas of 256 gray scale levels is prepared as a black canvas that is painted by black (luminance Y=0) pixels. Then, a drawing process is performed for the black canvas based on a drawing command included in the spool file SF. The object is represented by values of RGB, and thus, the drawing process is performed while the values of RGB are converted into luminance Y. Here, the luminance Y of an object is represented by luminance y. By performing the drawing process on the black canvas, the area in which an object exists has luminance (Y=y) of the object, and the area in which an object does not exist is black (Y=0). Next, a black-white inverting process is performed for the image drawn on the black canvas. Accordingly, the area in which an object exists has luminance (Y=255−y) that is acquired from performing a black-white inverting process for the luminance y of the object, and thus, the area in which an object does not exist becomes a white color (Y=255). When the inverted image resulted from performing the black-white inverting process is acquired, a drawing process is performed again for the image based on a drawing command included in the spool file SF. The drawing process is performed in the transparent mode.

Accordingly, the area in which an object does not exist remains in the white color (Y=255). On the other hand, luminance Y of the area in which an object exists has a value acquired from linearly combining the luminance (Y=255−y) before the drawing process and the luminance (Y=y) of the object which are weighted in accordance with the transmittance. Here, both the luminance (Y=255−y) before the drawing process and the luminance (Y=y) of the object cannot have a value Y=255, and accordingly, the luminance Y of the area in which an object exists after the drawing process in the transparent mode has the luminance value Y that is smaller (not a white color) than 255. Finally, the first position data POI from which the area (shown in black in the figure) in which an object exists and an area (shown in white in the figure) in which an object does not exist can be identified by the binary scale level is generated by performing a binarizing process based on whether the luminance Y is 255 (a white color) or not. In the first position data POI, even a white color area (a white background inside the CG) of the object can be identified as the area in which an object exists. In this embodiment, the second position data SOI and the first position data POI are configured to be sequentially generated. However, the second position data SOI and the first position data POI are independently generated based on the duplicated spool files SF, and accordingly, the processes for generating the second position data SOI and the first position data POI can be performed in parallel to each other. In Step S260, the object location area determining part PD3c acquires the first position data POI and the second position data SOI and determines the area in which an object exists based on the first and second position data.

FIG. 11 shows a process for determining an area in which an object exists in Step S250. In the figure, a raster in a position (the position of X1 that passes through the center of the CG shown in FIGS. 9 and 10) common to the first position data POI and the second position data SOI is shown. In Step S260, an area that is represented as an area in which an object exists by at least one between the first position data POI and the second position data SOI is finally determined as an area in which an object exists. Accordingly, a white area inside the CG that is represented as an area in which an object does not exist by the second position data SOI is represented as an area in which an object exists by the first position data POI and thus, is determined as an area in which an object exists. From the first position data POI, a white color area inside the object can be identified to have an object, and thus, basically the first position data POI is used. While the second data SOI is generated based on the print image ID that is used for performing a printing process, the first position data POI is generated by performing a rendering process independently. Accordingly, the positional accuracy of the first position data POI becomes lower than that of the second position data SOI.

As a result, by using the second position data SOI additionally, the positional accuracy of the area in which an object exists can be acquired. In addition, areas in which an object exists can be detected without any missing area as possibly as can be.

As described above, when determining the area in which an object exists is completed, the halftone processing part PD3d performs the halftone process for the print image ID in Step S270. The print image ID has been converted in color into the color space of CMYK in Step S240. In the halftone process of Step S270, the halftone process is performed only for the area in which an object is determined to exist in Step S260, and to other areas, a gray scale level for which ink of CMYK is not ejected is assigned. Accordingly, the range for the halftone process can be narrowed, and thereby a processing speed thereof can increase. When the halftone process is completed, the print data PD is generated in Steps S190 and S200, and the printer 20 performs a printing process based on the print data PD.

Figure 12:
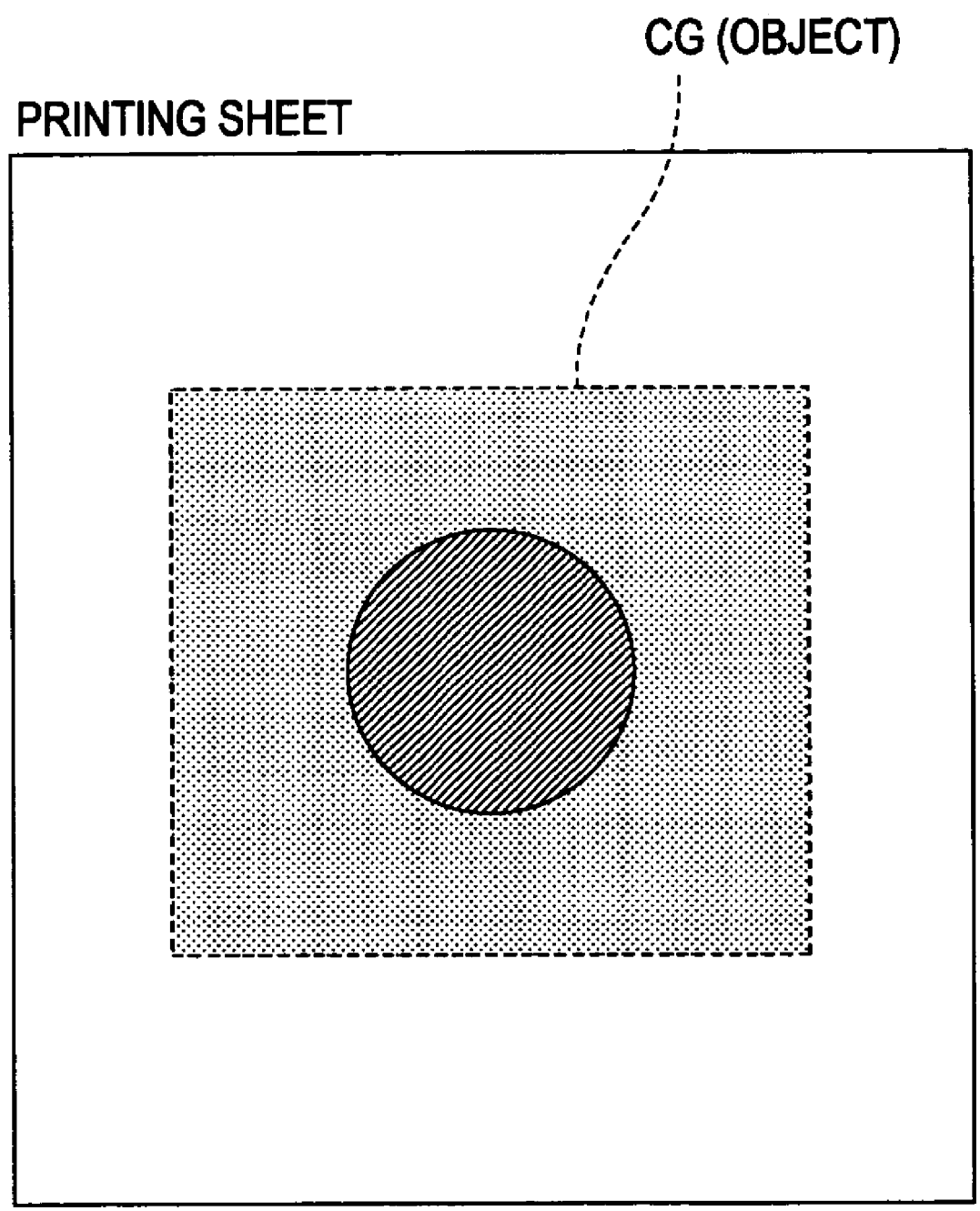

FIG. 12 shows an example of the print result for a case where the filling effect in a white background is turned on. In Step S240, in the stage in which the color converting section PD2 performs a color converting process for the print image ID uniformly by referring to the LUT 12b, both the background inside the CG and the margin area outside the CG are converted in colors as pixels having values of CMYK of C=M=1 and Y=K=0. However, the halftone processing part PD3d performs the halftone process only for the area in which an object exists in Step S270, and to other areas, a gray scale level for which ink is not forcedly ejected is assigned. Accordingly, dots of ink of CM are scattered as the background inside the CG, and any ink dot can be configured not to be formed in the margin area outside the CG. In other words, a state in which small amounts of ink are ejected only for an area to be represented in a white color inside the object can be formed. Accordingly, accurate color matching of the white color can be implemented for the inside the CG. In addition, the white color of the printing sheet is used for the inside of the CG, and thereby the amount of consumption of ink and a granular feeling can be suppressed.

(2-3) Process for a Case Where Filling Effect in White Background is Turned Off

Figure 13:
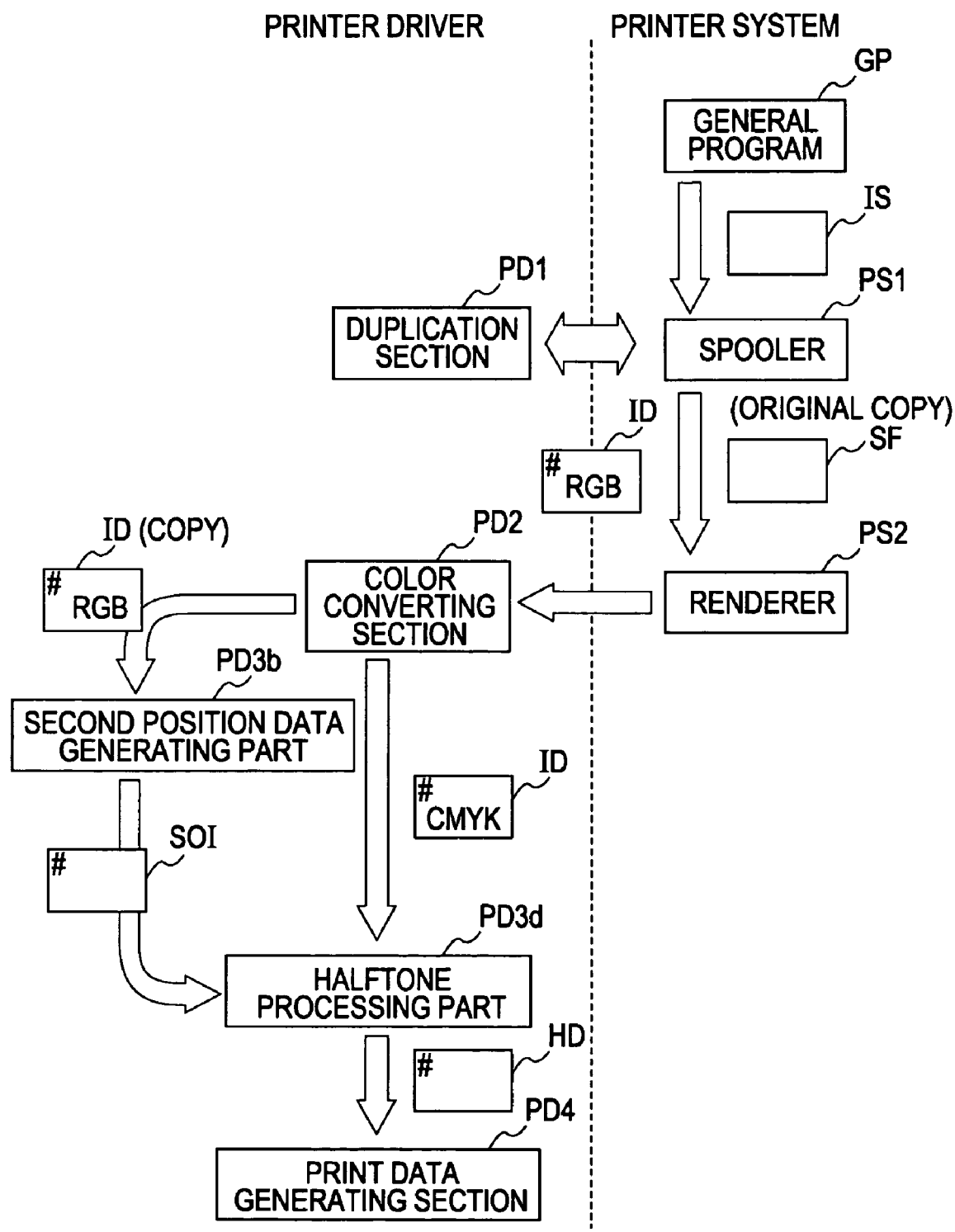
FIG. 13 is a schematic diagram showing a printing process according to an embodiment of the invention for a case where a filling effect in a white background is turned off.

FIG. 13 schematically shows the flow of data for a case where a direction for turning off the filling effect in a white background is received from a user. In Step S280, the spooler PS1 outputs a spool file SF to the renderer PS2 located on the next stage. Next in Step S290, as in Step S160, the renderer PS2 performs a drawing process based on the drawing command included in the spool file SF and the setting information acquired in Step S120 so as to generate the print image ID in which the color of each pixel is represented in the color space of RGB. In Step S300, the second position data generating part PD3b acquires the print image ID of the color space of RGB after the rendering process and performs the second position data generating process for generating the second position data SOI based on the copy of the print image ID. In addition, the second position data generating process performed here is the same as that of the above-described Step S230. Accordingly, the second position data SOI as shown in FIG. 9 is generated.

In Step S310, the print image ID as a copy source is transferred to the color converting section PD2 of the printer driver PD, and a color converting process is performed as in Steps S170 and S240. In Step S320, the halftone processing part PD3d performs a halftone process for the print image ID of the color space of CMYK that is acquired by the color converting process. In the halftone process of Step S320, the halftone process is performed only for the area (more precisely, an area of the image ID that is not colored in white) in which an object is represented to exist by the second position data SOI, and to other areas, a gray scale level for which ink of CMYK is not forcedly ejected is assigned. Accordingly, the range for the halftone process can be narrowed, and thereby a processing speed thereof can increase. When the halftone process is completed, the print data PD is generated in Steps S190 and S200, and the printer 20 performs a printing process based on the print data PD.

Figure 14:
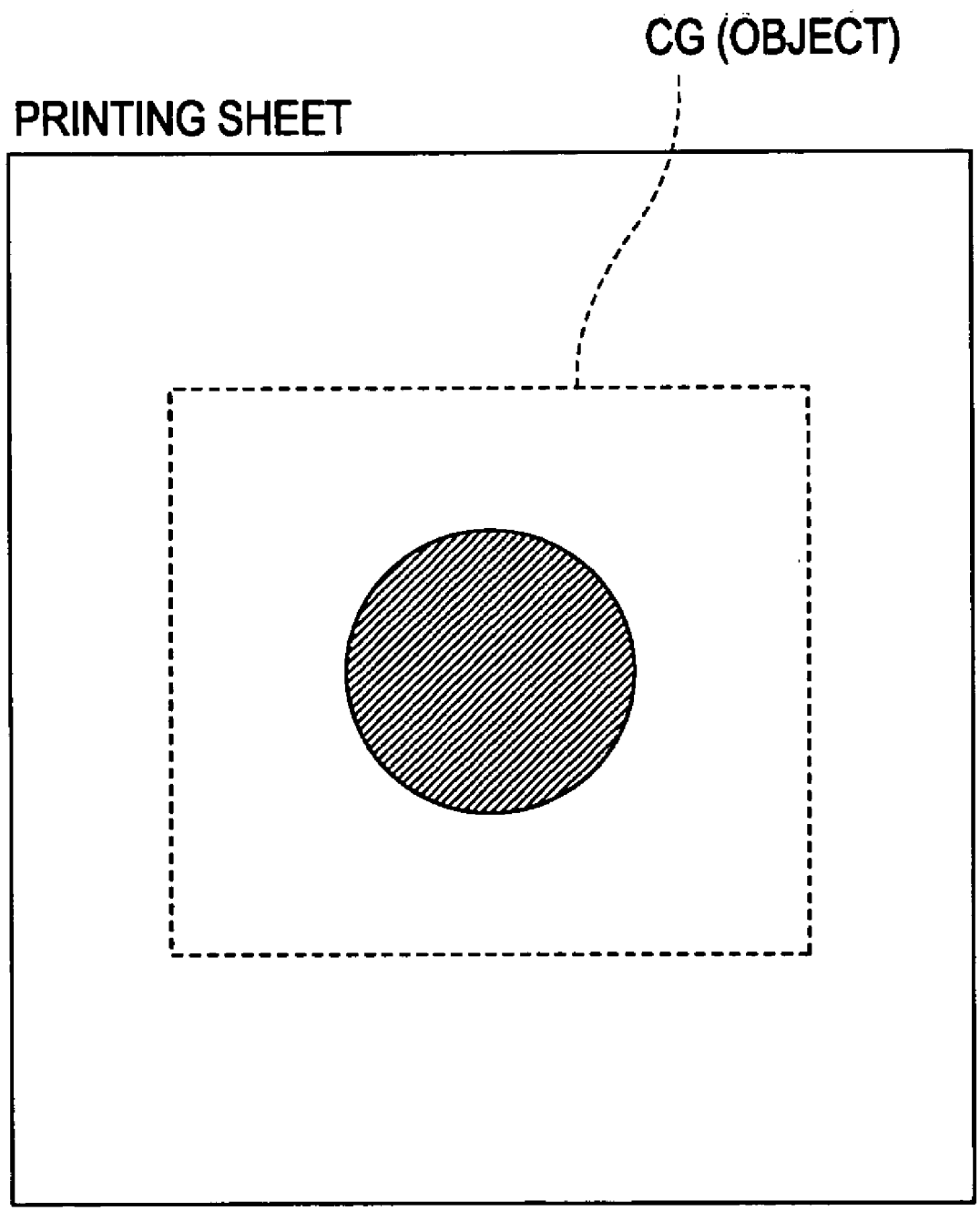
FIG. 14 is a diagram showing an example of a print result according to an embodiment of the invention for a case where the filling effect in a white background is turned off.

FIG. 14 shows an example of the print result for a case where the filling effect in a white background is turned off. In Step S320, the halftone processing part PD3d performs the halftone process only for the area (an area of the print image ID that is not colored in white) in which an object is represented to exist by the second position data SOI, and to other areas, a gray scale level for which ink is not forcedly ejected is assigned. Accordingly, any ink dot can be configured not to be formed inside the CG and the margin area outside the CG. In other words, a state in which ink is not filled in both the area inside the object to be represented in a white color and the margin area outside the object can be formed. Accordingly, a printing process in which the white color of the printing sheet is used can be implemented.

(3) Statistics

As described above, in this embodiment, three modes of halftone processes including a mode for turning on (the entire surface) the filling effect in the white background, a mode for turning on the filling effect in the white background, and a mode for turning off the filling effect in the white background can be performed in accordance with a direction of a user. In the mode for turning on the filling effect in the white background, whether a white color included in the print image ID after the rendering process is inside the object (originated from the object) or outside the object (not originated from the object) is identified, and an image effect can be turned off for only the white color outside the object. When it is identified whether the white color included in the print image ID is inside the object or the outside the object, the first position data POI that is independently generated by the halftone section PD3 based on the duplicated spool file SF is used. In such a case, the renderer PS2 of the print system PS can perform a rendering process based on the original spool file SF and is not needed to perform a special process. Accordingly, whether the white color included in the print image ID is inside the object or outside the object can be identified without modifying the renderer PS2. However, since the first position data POI is independently generated based on the duplicated spool file SF, a case where there is a difference between the print image ID rendered by the renderer PS2 and the first position data may be considered. However, in this embodiment, an area in which an object exists is determined by using the second position data SOI that is generated based on the print image ID, and accordingly, determination of the area in which an object exists can be accurately performed.

What is claimed is:

1. A printing device that generates print data based on a print source, the print data including a margin area to be colored in a predetermined color and an object that includes a white area, the printing device comprising:
   a rendering unit that generates a print image by rendering a spool file generated from the print source;
   a halftone unit that includes:
      a first unit that generates a first position data indicating a white area of an object in the print image generated by the rendering unit, rendering the spool file using a rendering technique different from that used by the rendering unit;
      a second unit that performs a halftone process only for the white area; and
   a print data generating unit that generates the print data based on halftone data generated by the halftone unit;
   wherein the first unit of the halftone unit generates a second position data indicating a white area of the object based on the print image rendered by the rendering unit and the second unit of the halftone unit performs a halftone process for the white area.

2. The printing device according to claim 1, further comprising:
   a duplication unit that duplicates a spool file that is generated from the print source, thereby creating a duplicated spool file;
   wherein the first unit of the halftone unit generates the first position data by rendering the object on a black canvas based on the duplicated spool file and the second unit of the halftone unit performs a halftone process for an inverted image acquired from performing black-white inversion of the black canvas, in a transparent mode based on the duplicated spool file.

3. The printing device according to claim 1, wherein the halftone unit determines the white area based on at least one of the first position data and the second position data.

4. The printing device according to claim 1, wherein the halftone unit determines an area, which is not white, of the print image based on the second position data and performs the halftone process for the determined area.

5. A printing method that generates print data based on a print source, the printing method comprising:
   generating a print image by rendering the spool file;
   generating a first position data indicating a white area of an object in the print image by rendering the spool file using a technique different from that used in the step of generating the print image;
   performing a halftone process only for the white area; and
   generating the print data based on halftone data generated by the halftone process;
   wherein the step of generating a first position data also generates a second position data indicating a white area of the object based on the print image rendered by the step of generating a print image, and the step of performing a halftone process performs a halftone process for the white area.

6. A tangible computer-readable medium, stored thereon a program for allowing a computer to perform a function for generating print data in a printing process based on a print source, the print data including a margin area to be colored in a predetermined color and an object that includes a white area, the function comprising:
   a rendering function for generating a print image by rendering the spool file;
   a halftone function that includes:
      a first function for generating a first position data indicating a white area of an object in the print image by rendering the spool file using a technique different from that used in the rendering function;
      a second function for performing a halftone process only for the white area; and
   a print data generating function that generates the print data based on halftone data generated by the halftone function;
   wherein the first function of the halftone function generates a second position data indicating a white area of the object based on the print image rendered by the rendering function and the second function of the halftone function performs a halftone process for the white area.

7. The printing method according to claim 5, further comprising the step of:
duplicating a spool file that is generated from a print source, thereby generating a duplicated spool file;
wherein the step of generating a first position data generates the first position data by rendering the object on a black canvas based on the duplicated spool file and the step of performing a halftone process performs a halftone process for an inverted image acquired from performing black-white inversion of the black canvas, in a transparent mode based on the duplicated spool file.

8. The printing method according to claim 6, further comprising a step of:
determining the white area based on at least one of the first position data and the second position data.

9. The printing method according to claim 6, further comprising a step of:
determining an area, which is not white, of the print image based on the second position data and performs the halftone process for the determined area.

* * * * *